March 10, 1959   S. F. ANDERSON ET AL   2,877,121
METHOD OF FORMING FROZEN CONFECTION PACKAGES
Filed Jan. 21, 1954
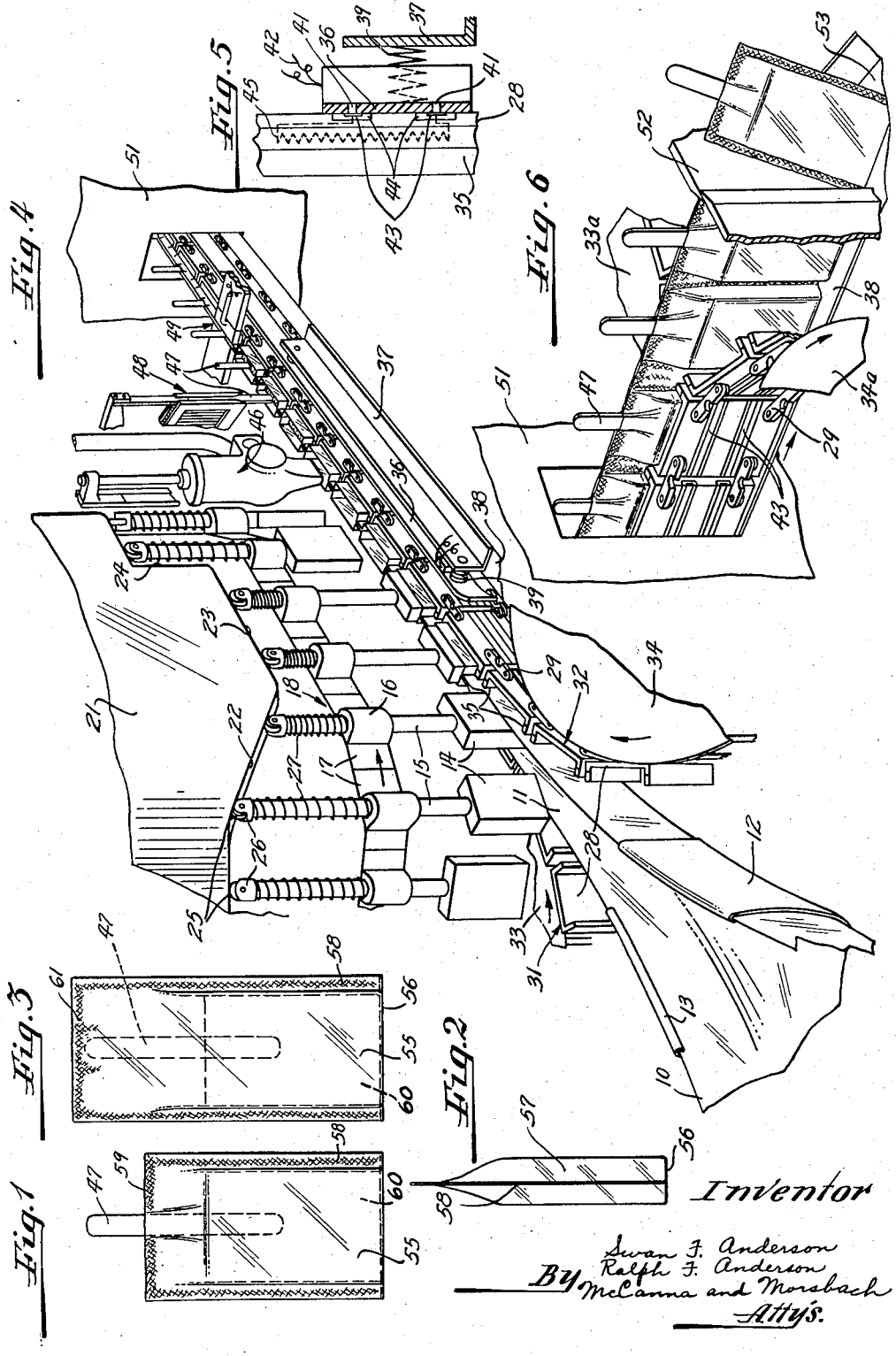
Inventor
Swan F. Anderson
Ralph F. Anderson
By McCanna and Morsbach
Attys.

United States Patent Office 2,877,121
Patented Mar. 10, 1959

2,877,121

METHOD OF FORMING FROZEN CONFECTION PACKAGES

Swan F. Anderson and Ralph F. Anderson, Rockford, Ill.

Application January 21, 1954, Serial No. 405,452

4 Claims. (Cl. 99—180)

This invention relates to frozen confection packages and to a method of forming the same.

At present, molded bars of a frozen confection such as ice cream are most commonly formed by flowing the confection in a plastic state into the molds; inserting sticks into the confection in the molds; chilling the molds to solidify the confection and then momentarily heating the molds to permit removal of the frozen confection after which the bars are conveyed by their sticks to a packaging station to be packaged. This necessitates apparatus for handling the molds during the filling, chilling and momentary heating thereof and further apparatus separate from the mold handling apparatus for handling the confection bars by their sticks after removal from the molds and during the packaging thereof. In packaging the confection, the latter is usually inserted into a loose open-ended bag or wrapper.

An important object of this invention is the provision of a confection package wherein a bar of ice cream, ice, sherbet or the like, either with or without a disposable handle secured therein is completely sealed in an envelope of preferably transparent or translucent sheet material.

Another object of this invention is the provision of a frozen confection package wherein the confection is enclosed within an envelope sealed along three edges and sealed to a disposable handle secured to the confection.

Another object of this invention is the provision of a frozen confection package wherein the confection is sealed against contamination within the package and the disposal handle is supported by the package to prevent loosening of the handle in the confection during normal handling of the package.

A further object of this invention is the provision of a frozen confection package wherein the confection is enclosed within an envelope sealed along the bottom edge and to the disposal handle whereby when the confection package is opened from the top, the package can be used as a drip shield for the confection.

A still further object is the provision of a novel method for producing frozen confection packages wherein a strip of packaging material is continuously formed into spaced cavities, the confection is deposited into the cavities and the cavities then sealed and passed through a freezing tunnel to emerge as a succession of packages sealed together in strip form.

Yet another object is the provision of a novel method for producing frozen confection packages wherein a strip of packaging material is continuously shaped into spaced cavities within spaced molds and the molds thereafter operated to convey the spaced cavities and support the strip during the subsequent filling of the cavities with frozen confection; insertion of a stick into the confection; sealing of the cavities and chilling of the packages whereby the packages emerge from the molds in strip form.

Other objects and many of the attendant advantages of this invention will be more readily apparent as the same becomes better understood by reference to the following detailed description when considered in connection with the accompanying drawings wherein:

Figure 1 is a plan view of one form of the finished packages;

Fig. 2 is a side view of the package of the form illustrated in Fig. 1;

Fig. 3 is a plan view of a second form of finished package;

Fig. 4 is a partial perspective view of an apparatus for carrying out the method of the present invention to form the frozen confection packages and showing the packages being conveyed into the chill tunnel;

Fig. 5 is a fragmentary sectional view showing the apparatus for heating the packaging material to effect sealing of the packages; and Fig. 6 is a partial perspective view of the package forming apparatus showing the packages emerging from the chill tunnel.

The continuous strip of material which is formed into spaced cavities and filled with a frozen plastic confection may be of any moisture-proof sheet material which is preferably translucent or transparent and which is either heat or pressure sealable when pressed upon itself. The material may be coated with a sealable material on an entire surface or only in spaced transverse strips and along the edges thereof where the material is to be pressed upon itself to effect a seal. In the present invention, it is preferable to use a heat-sealable material or coating on the sheet material to prevent resealing of the package containing the confection after opening thereof and thereby avoid the possibility of contamination.

In the present embodiment of the invention the strip 10 as it is unwound from the roll (not shown) is preferably formed into a U-shaped channel 11 as by passing the strip through a flared U-shaped guide 12 having inwardly rolled edges 13 thereon for retaining the strip in the guide as it is passed therethrough. A plurality of spaced mandrels 14 are inserted between the sides of the U-shaped channel and moved therewith as the channel is advanced. In the apparatus disclosed, the mandrels are carried by rods 15 slidably mounted in blocks 16 which are maintained in predetermined spaced relation by articulated links 17 to thereby form an endless conveyor 18 for the mandrels, which conveyor is supported on suitable supporting wheels (not shown). In inserting the mandrels into the channel, they may be moved downwardly therein into engagement with the lower portion of the channel to properly position the latter, and for this purpose there is provided an overlying oval cam track 21 having a curved inclined portion 22 and an elongated straight dwell portion 23, the dwell portion having a sharp trailing edge 24 to permit the mandrels to be rapidly elevated out of the channel. Rollers 25 are provided on heads 26 on the upper ends of the rods, which rollers engage the cam track to move the mandrels in opposition to the springs 27 mounted on the rods between the heads 26 and the blocks 16.

As the spaced mandrels are inserted into the channels, the opposed faces of the channels between the mandrels are brought into contact and sealed. This is achieved by the provision of U-shaped mold half-sections 28 formed complementary to the mandrel and disposed on opposite sides of the channel in registry with the mandrel. The mold half-sections are maintained in proper spaced relation by links 29 which pivotally interconnect the mold half-sections to form a pair of articulated endless conveyors 31 and 32 disposed on opposite sides of the channel and carried by pairs of spaced sprockets 33 and 33a and 34 and 34a respectively. The sprockets are driven in synchronism by any suitable means, preferably in step fashion to advance the mold half-sections, the mandrels 14 being inserted between the sides of the channel 11 as the mold half-sections converge on opposite sides of the channel. The legs 35 of the mold sections are moved into abutting contact with the sides of the package material and are pressed thereagainst by the elongated pressure shoes 36 supported as by brackets 37 carried by the conveyor support table 38, the shoes being yieldably urged by springs 39 into engagement with the mold sections as they move past the shoes. A pressure applying shoe is provided for each of the conveyors 31 and 32 to urge the mold sections towards each other and press the opposed faces of the channel therebetween together, and one or both of the shoes is provided with brushes 41 adapted to be connected by conductors 42 to a source of power. The brushes slidably contact commutator bars 43 carried by the mold sections and insulated therefrom by insulation strips 44, which bars are connected to electrical heating elements 45 disposed in the legs 35 of each of the U-shaped mold sections. Thus, as the mold sections move past the pressure plate, pressure is applied thereto and the leg portions thereof momentarily heated to heat seal the opposing faces of the channel between the mandrels.

The packaging apparatus is advantageously constructed so that one or more mandrels are clamped between the mold sections at all times whereby the mandrels are advanced with and by the mold sections, thereby obviating the necessity of a separate synchronized drive therefor. As the molds are advanced, the rollers 25 on the heads 26 of the mandrels reach the sharp trailing edge 24 of the dwell portion and are moved rapidly out of the spaced cavities formed in the channel 11 of packaging material. The cavities are advanced with the mold sections and preferably while pressure is still applied thereto by the pressure plate, the cavities are filled at a filling station with a plastic frozen confection such as ice cream, sherbet or the like from a dispenser 46 which is operated in synchronism with the conveyors 31 and 32. The cavities proceed past a stick dispensing station wherein sticks 47 are inserted into the frozen confection from a dispenser 48 of conventional construction and also operated in timed relation with the advance of the cavities and from thence to a sealing station whereat the open end of the cavity is sealed above the level of the confection as by heated reciprocal sealing irons 49. The cavity may be sealed just above the level of the confection as shown in Fig. 1 and sealed to the stick which projects outwardly from the package, or alternatively the depth of the channel and the size of the mold sections may be proportioned with regard to the level to which the cavities are to be filled so that when the stick is inserted in the confection, it is disposed wholly within the cavity and may be sealed therein, as shown in Fig. 3.

After sealing, the filled packages are passed, preferably while being retained by the mold sections, through a chilling tunnel 51 wherein the confection is chilled to form retaining condition, the mold sections being removed from the packages as they emerge from the tunnel, as shown in Fig. 6. The packages leave the mold sections in the form of a continuous strip, and the packages are then severed or perforated as desired into individual packages or multiple packages as by the cutter mechanism 52 which may be operated manually or in timed relation to the advance of the packages by suitable apparatus and the separated packages thereafter conveyed by a chute 53 to a loading station.

The preferred method of practicing the invention is as follows:

The strip of material 10 which is preferably heat sealable on the surfaces thereof to be brought into adhering contact has the sides thereof displaced to form a U-shaped channel 12 and the mandrels 14 are interposed between the sides of the channel at spaced intervals as the latter is advanced, the mandrels being moved downwardly into contact with the bottom of the channel to accurately position the latter. Thereafter, the mold sections 28 are moved laterally into contact with opposite sides of the channel and advanced therewith to bring the opposing faces of the channel between the mandrels into contact and draw the material over the mandrels. The molds and mandrels are advanced with the channel to a station where the molds are pressed against opposite sides of the channel and the edges of the molds momentarily heated to seal the contacting surfaces of the channel after which the mandrels are withdraw from the channel leaving molds lined with partially sealed packages.

The packages are conveyed within the molds to a filling station and filled with a measured quantity of frozen confection in a semi-solid state from the dispenser 46 and thereafter conveyed to a stick dispensing station and a stick is inserted into the confection. The packages which form the mold linings project above the upper surface thereof and the opposed faces of the packages are brought into adhering contact above the level of the confection at the sealing station as by movable sealing irons 49 which reciprocate into and out of contact with the projecting ends of the package, in timed relation to the advancement thereof, to thereby seal the open end of the package. The seal on the end of the package may either be between the level of the confection and the end of the stick, in which case the package is sealed to the stick as shown in Figs. 1 and 2, or the package may be dimensioned so as to enclose the confection and attached stick as shown in Fig. 3. The sealed packages are then conveyed preferably while still retained in the molds through a chilling tunnel 51 from which they emerge in the form of a continuous strip of packages containing a solid frozen confection and a handle. The strip of packages is then cut into individual or groups of packages and passed to a loading station.

The packages formed in accordance with the foregoing method comprise an envelope having side panels 55 and an integral end panel 56. The edges 57 are folded towards each other and sealed on the abutting surfaces to form an outstanding rib 58 along each edge approximately midway between the side panels. In the embodiment shown in Fig. 1 the ends 59 of the side panels are pressed together and the opposing faces sealed to each other and to the stick 47 projecting out of the confection 60 and at the juncture thereof form an upstanding rib 59 disposed symmetrically of the handle and which is sealed to opposite sides thereof. In the embodiment illustrated in Fig. 3, the side panels 55 have the end 61 thereof sealed together above the level of the handle so that the handle and confection are completely enclosed in the package.

We claim:

1. The method of forming frozen confection packages which comprises providing spaced strips of moisture-resistant sealable wrapping material, inserting a mandrel at spaced intervals between the strips, moving open top mold half-sections laterally into engagement with opposite outer faces of the strips while moving the mold sections in a direction longitudinally of the strips to draw the material around the mandrels and bring the opposing inner faces of the strips into adhering contact between the mandrels and to advance the strips and mandrels, withdrawing the mandrels from between the strips while retaining the strips between the mold half-sections to form the strips into spaced open-top pockets between the mold half-sections, filling the pockets with a semi-solid frozen confection while retaining the pockets between the mold half-sections, inserting sticks into the confection in each pocket while retaining the pockets between the mold sections, bringing the strips together above the level of the confection into adhering contact to seal the open top of the pockets while retaining the pockets between the mold sections, conveying the filled and sealed pockets through a refrigeration zone to solidify the confection therein while retaining the pockets between the mold half-sections, and thereafter removing the mold half-sections from the pockets.

2. The method of forming frozen confection packages which comprises displacing the side edges of a continuous strip of sealable moisture-resistant wrapping material to form a channel of U-shaped cross-section, forming the channel into open top pockets by interposing mandrels between the sides of the channel and simultaneously moving mold half-sections laterally of the channel into engagement with the outer faces thereof to draw the material around the mandrels and bring the opposed inner faces of the channel into adhering contact, moving the mold sections in a direction longitudinally of the strip while moving them laterally into contact with the channel to advance the channel and mandrels to successive stations, withdrawing the mandrels from the channel at one station while retaining pockets between the mold half-sections, filling the pockets in the channel with a semi-solid frozen confection at another station while retaining the pockets between the mold sections, inserting a stick into the confection in each pocket at a further station while retaining the pockets between the mold sections, bringing the upper edges of the channel into adhering contact with each other and with opposite sides of the stick handle at a level above the level of the confection while retaining the pockets between the mold sections to seal the open top of the pockets, and passing the filled and sealed pockets through a refrigeration zone to solidify the confection.

3. The method of claim 2 including the step of moving the mandrel downwardly in the channel into engagement with the bottom thereof simultaneously with the movement of the mold sections into engagement with the channel.

4. The method of forming frozen confection packages comprising providing spaced strips of sealable moisture-resistant wrapping material, interposing mandrels at spaced intervals between the strips, forming open top pockets between the strips by moving open top mold half-sections laterally into engagement with opposite outer faces of the strips and around the mandrels to draw the material around the mandrels and bring opposed inner faces into adhering contact between the mandrels, moving the mold half-sections in a direction longitudinally of the strips while the mandrels are interposed therebetween to advance the strips and mandrels to successive stations, withdrawing the mandrels from between the strips at one station while retaining the strips between the mold half-sections, partially filling the pockets between the strips with semi-solid confection while retaining the pockets between the mold half-sections, bringing the strips into adhering contact at a further station while retaining the pockets between the mold half-sections, and thereafter removing the mold half-sections.

References Cited in the file of this patent
UNITED STATES PATENTS

| Number | Name | Date |
|---|---|---|
| 1,618,324 | Burt | Feb. 22, 1927 |
| 1,986,589 | Mapes | Jan. 1, 1935 |
| 2,227,236 | Vogt | Dec. 31, 1940 |
| 2,450,364 | Smith | Sept. 28, 1948 |
| 2,582,655 | Schenk | Jan. 15, 1952 |
| 2,627,472 | Valenta | Feb. 3, 1953 |
| 2,691,259 | Weckesser | Oct. 12, 1954 |

OTHER REFERENCES

"Modern Packaging," January 1952, pp. 102, 103, 104, 180, 183 and 185, articles entitled "Sundae in a Bag."

"The Ice Cream Trade Journal," November 1953, p. 85.